(12) United States Patent
Ohbayashi

(10) Patent No.: US 7,732,788 B2
(45) Date of Patent: Jun. 8, 2010

(54) RADIATION IMAGE CONVERTING PANEL, SCINTILLATOR PANEL AND RADIATION IMAGE SENSOR

(75) Inventor: Yasushi Ohbayashi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 11/976,323

(22) Filed: Oct. 23, 2007

(65) Prior Publication Data

US 2009/0101844 A1    Apr. 23, 2009

(51) Int. Cl.
    G01N 21/64    (2006.01)
(52) U.S. Cl. .................................. 250/488.1
(58) Field of Classification Search .............. 250/483.1, 250/484.2–484.5, 361 R
    See application file for complete search history.

(56) References Cited

U.S. PATENT DOCUMENTS

| | | | |
|---|---|---|---|
| 4,769,549 A | 9/1988 | Tsuchino et al. | |
| 4,873,708 A * | 10/1989 | Cusano et al. | 378/19 |
| 6,429,430 B2 | 8/2002 | Sato et al. | |
| 6,469,307 B2 | 10/2002 | Takabayashi et al. | |
| 6,692,836 B2 | 2/2004 | Reichert et al. | |
| 6,753,531 B2 | 6/2004 | Homme et al. | |
| 6,762,420 B2 | 7/2004 | Homme et al. | |
| 6,777,690 B2 | 8/2004 | Homme et al. | |
| 6,835,936 B2 | 12/2004 | Okada et al. | |
| 6,849,336 B2 | 2/2005 | Homme et al. | |
| 7,034,306 B2 | 4/2006 | Homme et al. | |
| 7,087,908 B2 | 8/2006 | Homme | |
| 7,141,803 B2 | 11/2006 | Homme | |
| 2001/0030291 A1 | 10/2001 | Homme et al. | |
| 2002/0017613 A1 | 2/2002 | Homme et al. | |
| 2002/0076568 A1 | 6/2002 | Reichert et al. | |
| 2003/0143424 A1* | 7/2003 | Steklenski et al. | 428/690 |
| 2003/0160185 A1* | 8/2003 | Homme | 250/483.1 |
| 2005/0133731 A1 | 6/2005 | Matsumoto et al. | |
| 2006/0060792 A1 | 3/2006 | Matsumoto et al. | |

FOREIGN PATENT DOCUMENTS

| | | |
|---|---|---|
| JP | 56-89702 | 7/1981 |
| JP | 61-73901 | 4/1986 |
| JP | 1-131500 | 5/1989 |

(Continued)

OTHER PUBLICATIONS

Weber et al., "Giant Birefringent Optics in Multilayer Polymer Mirrors,", Mar. 2000, Science, vol. 287, No. 5462, pp. 2451-2456.*

Primary Examiner—David P Porta
Assistant Examiner—Kiho Kim
(74) Attorney, Agent, or Firm—Drinker Biddle & Reath LLP

(57) ABSTRACT

For a radiation image converting panel according to the present invention, a converting portion that converts a radiation image to an optical image is formed on a support for which a dielectric multilayer film is formed on a metal reflector, and the dielectric multilayer film includes at least a first dielectric layer that is in contact with the metal reflector and a second dielectric layer that is formed on the first dielectric layer and has a higher refractive index than that of the first dielectric film layer to light emitted by the converting portion.

12 Claims, 19 Drawing Sheets

FOREIGN PATENT DOCUMENTS

| | | |
|---|---|---|
| JP | 2000-356679 | 12/2000 |
| JP | 2003-262700 | 9/2003 |
| JP | 2004-279428 | 10/2004 |
| JP | 2004-294137 | 10/2004 |
| JP | 2004-325126 | 11/2004 |
| JP | 2005-91221 | 4/2005 |
| JP | 2005-172511 | 6/2005 |
| JP | 2006-078472 | 3/2006 |
| JP | 2006-113007 | 4/2006 |
| JP | 2006-119124 | 5/2006 |
| JP | 2006-189377 | 7/2006 |
| JP | 2006-220439 | 8/2006 |
| JP | 2006-267013 | 10/2006 |
| JP | 2007-040836 | 2/2007 |
| KR | 2006-0012034 | 2/2006 |
| KR | 10-0745991 | 8/2007 |
| RU | 2 181 491 | 4/2002 |
| RU | 2 298 813 | 5/2007 |
| WO | 00/63722 | 10/2000 |
| WO | 02/23219 | 3/2002 |
| WO | 02/23220 | 3/2002 |
| WO | WO 2006/049183 | 5/2006 |

* cited by examiner

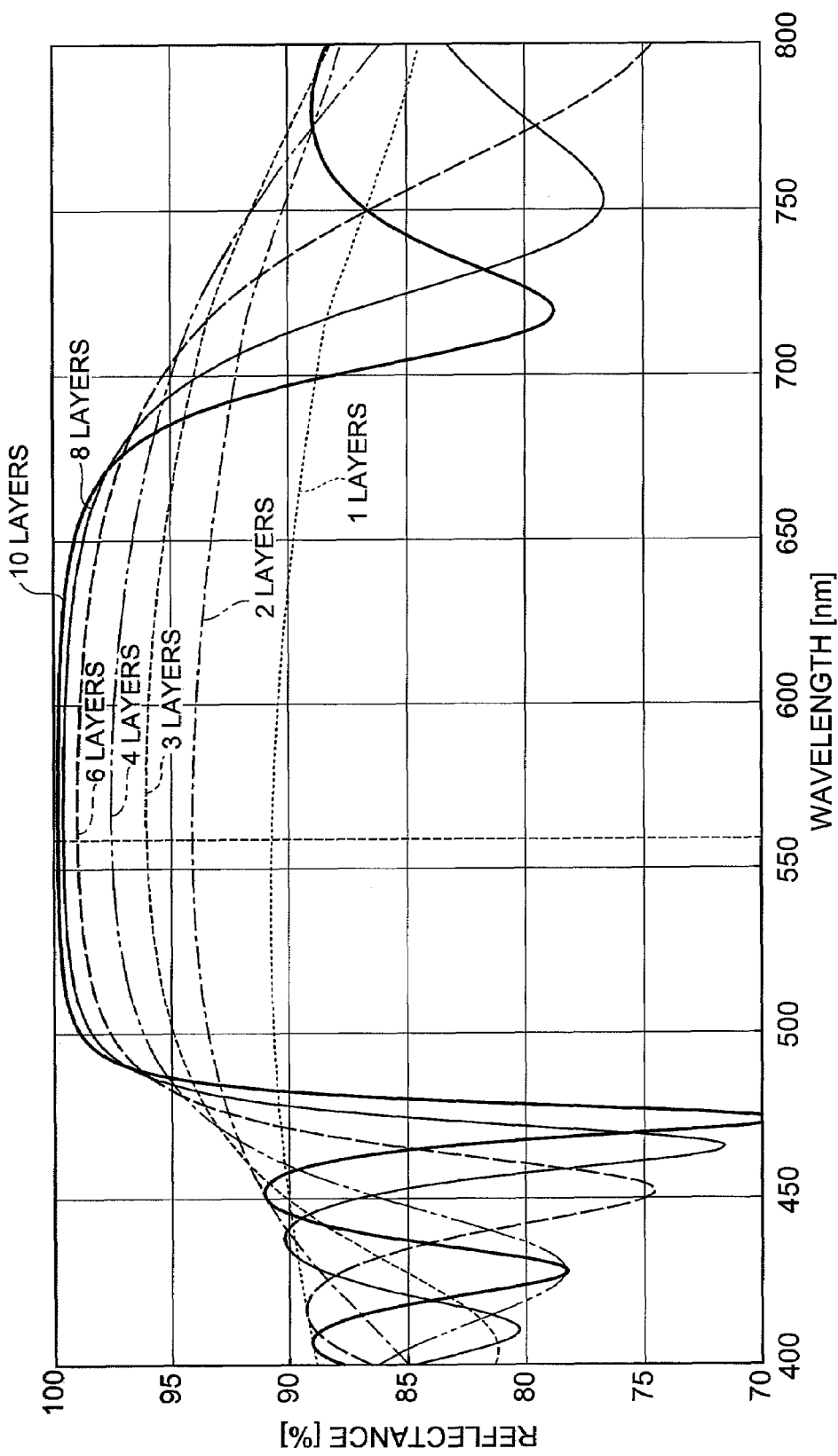

RADIATION IMAGE CONVERTING PANEL, SCINTILLATOR PANEL AND RADIATION IMAGE SENSOR

BACKGROUND OF THE INVENTION

1. Field of the Invention

The present invention relates to a scintillator panel that converts a radiation image used for medical or industrial radiography or the like to an optical image.

2. Related Background Art

Conventionally, X-ray sensitive films have been used for medical or industrial radiography, however, radiation imaging systems using radiation detectors have become widespread from the aspects of convenience and storage stability of radiographic results. In such a radiation imaging system, two-dimensional image data by radiation is obtained as an electrical signal by the radiation detector, and this signal is processed by a processor and displayed on a monitor.

As a typical radiation detector, a radiation detector exists, having a structure for which a radiation image converting panel (hereinafter, referred to as a "scintillator panel") with a scintillator to convert radiation to a visible light formed on a substrate made of aluminum, glass, fused silica or the like is formed, and this is combined with an image pickup device. In this radiation detector, the scintillator converts radiation that is made incident to an optical image (not always of a visible light) in a wavelength range detectable by the image pickup device, and the image pickup device detects the optical image.

As scintillator panels structured as such, scintillator panels disclosed in International Publications WO 00/63722, WO 02/23219 A1, WO 02/23220 A1, etc., have been known. The scintillator panel disclosed in WO 00/63722 is one for which, on a radiation-transmissive substrate, a thin reflective metal film and a protective film are laminated, and a scintillator is deposited. The scintillator panel disclosed in WO 02/23219 A1 is one for which provided on a heat-resisting radiation-transmissive substrate is a dielectric multilayer film, and thereon a scintillator is deposited. The scintillator panel disclosed in WO 02/23220 A1 is one for which provided on a light-transmissive substrate is a dielectric multilayer film, and thereon a scintillator is deposited, and provided on either one or both of an interface between the dielectric multilayer film and light-transmissive substrate and a surface of the light-transmissive substrate opposite to the dielectric multilayer film is a light incidence/reflection inhibiting member that inhibits incidence/reflection of an unnecessary light. In these scintillator panels, radiation that has been transmitted through the substrate is made incident into the scintillator, converted to an optical image, and outputted from a surface thereof opposite to the incident surface of radiation, and a reflecting material provided between the scintillator and substrate reflects light emitted from the scintillator toward the substrate, whereby a radiation image with a high intensity can be obtained.

SUMMARY OF THE INVENTION

In the scintillator panels described above, the higher the reflectance of the reflector, the higher the intensity of a radiation image can be obtained. In the case of a dielectric multilayer film, a high reflectance can be realized by increasing the number of layers thereof.

In recent years, scintillator panels have been increased in size in application to chest radiography and the like, however, it is difficult in terms of mass production to laminate multiple layers of dielectric films with a uniform film thickness on such large-sized panels, and this causes an increase in the manufacturing cost. In addition, for obtaining a radiation image with a high intensity while inhibiting the amount of radiation exposure, it is desirable to reduce a loss due to absorption by the substrate etc., until radiation reaches the scintillator to the minimum, so that it is preferable to provide the substrate etc., as thin as possible. The more the substrate etc., is increased in size to become thinner, the more difficult it becomes to form multilayered dielectric films.

While the applicant has proceeded with development for mass production of a large-sized thin scintillator panel, the inventors have discovered in the course of development that a warp on the order of a few millimeters to a few tens of millimeters can occur to the substrate as a result of a scintillator formation when the substrate is thinned and increased in size. It was found that, when a warp occurred as such, an inorganic material that forms the dielectric film is low in resistance to deformation produced by this warp since this is poor in flexibility, elasticity, and ductility, and if the dielectric film layer is thickened, an inconvenience such that a crack is produced in the dielectric film occurs.

Furthermore, when an image sensor is adhered to the scintillator panel to form a radiation image sensor, it is necessary to flatten an adhering surface of the scintillator panel, and if such a warp as mentioned above has occurred in the scintillator panel, applying a stress to eliminate the warp results in a repeated stress application to the substrate, which makes a crack more likely to occur.

It is therefore an object of the present invention to provide a large-sized and thin radiation image converting panel, scintillator panel, and radiation image sensor which allow obtaining a radiation image with a high intensity and can be easily mass-produced.

In order to achieve the above object, for a radiation image converting panel according to the present invention, in a radiation image converting panel including a converting portion that converts a radiation image to an optical image on a support, the support includes: (1) a metal reflector; and (2) a dielectric film mirror including at least a first dielectric layer which is in contact with the metal reflector and formed thereon and a second dielectric layer which is formed on the first dielectric layer and has a higher refractive index than that of the first dielectric layer to light of an optical image outputted from the converting portion, and the converting portion is formed on the dielectric film mirror side.

In addition, for a scintillator panel according to the present invention, a scintillator is used as the converting portion of the above radiation image converting panel, and in a scintillator panel for which a scintillator composed of a plurality of needle crystals is formed on a support, the support includes: (1) a metal reflector; and (2) a dielectric film mirror including at least a first dielectric layer which is in contact with the metal reflector and formed thereon and a second dielectric layer which is formed on the first dielectric layer and has a higher refractive index than that of the first dielectric layer to light emitted from the scintillator, and the scintillator is formed on the dielectric film mirror side.

According to the inventor's knowledge, when combining a plurality of dielectric films different in the refractive index to compose a mirror, in the case of two layers, the refractive index as a whole becomes higher if a layer lower in the refractive index is provided as a first layer with reference to the side opposite to a light incident surface and thereon a layer higher in the refractive index than the first layer is laminated as the second layer. The present invention is based on this knowledge. By employing such construction as in the above, a high light reflectance can be obtained even with a small number of layers, and not only can lamination be favorably performed even when the substrate is thin, but occurrence of a crack in the dielectric layers can also be prevented even when the substrate has been warped in a subsequent process, and thus a radiation image with a high intensity can be obtained, and mass production thereof also becomes easier.

It is preferable that the first dielectric layer contains $SiO_2$, and the second dielectric layer contains at least one material from $TiO_2$, $Nb_2O_5$, $Ta_2O_5$, $HfO_2$, and $ZrO_2$. Since $SiO_2$ is lower in the refractive index than any of $TiO_2$, $Nb_2O_5$, $Ta_2O_5$, $HfO_2$, and $ZrO_2$ and also has a large difference in the refractive index, a high reflectance can be realized.

More preferably, the dielectric film mirror is formed by laminating three or more layers of the first dielectric layer and the second dielectric layer alternately. By laminating three or more layers, the reflectance can be further improved.

However, when the number of laminations is increased, although the reflectance is improved, the difficulty in lamination is increased as described above, and resistance to a warp that can possibly be produced in a subsequent process is also lowered, and thus in consideration of simultaneous pursuit of a high reflectance and mass producibility, the number of laminations of the dielectric film mirror is 10 layers or less, or the film thickness thereof as a whole is 1 μm or less.

The scintillator panel may further include a transparent organic film which is formed, on the dielectric film mirror, at least between the same and the scintillator, and has a lower refractive index than that of the second dielectric layer to light emitted by the scintillator. By such configuration, not only is the dielectric film mirror protected by the transparent organic film, but an effect to further improve the light reflectance can also be obtained.

As the metal reflector, a thin metal film or a metal substrate can be used, and when the metal reflector is a thin metal film, handling thereof becomes easy if the scintillator panel further includes a supporting substrate that supports the metal reflector. If these types of metal reflectors are formed of aluminum, silver, or gold, since the light reflectance of the reflectors themselves can be increased, the light reflectance as a whole is improved, which is preferable.

BRIEF DESCRIPTION OF THE DRAWINGS

FIG. 10 is a graph showing wavelength characteristics of light reflectance of the dielectric layer shown in FIG. 9A.

DESCRIPTION OF THE PREFERRED EMBODIMENTS

Figure 1:
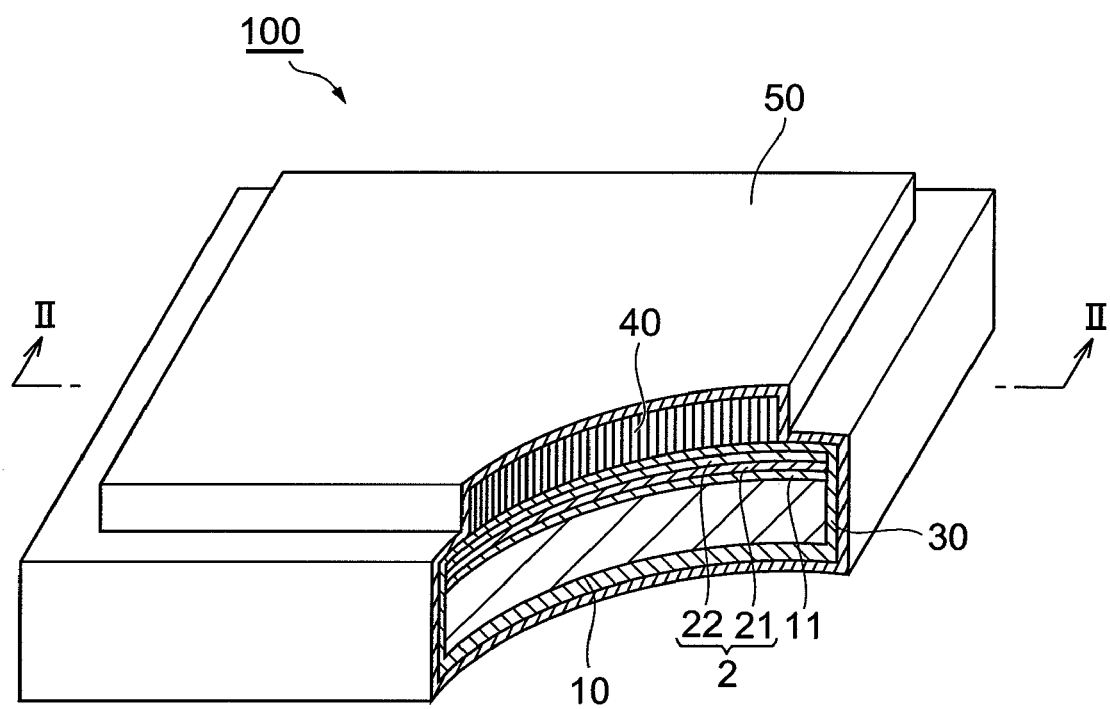
FIG. 1 is a partially broken perspective view showing a configuration of a first embodiment of a scintillator panel according to the present invention.

Hereinafter, preferred embodiments of the present invention will be described in detail with reference to the accompanying drawings. To facilitate the comprehension of the explanation, the same reference numerals denote the same parts, where possible, throughout the drawings, and a repeated explanation will be omitted. In addition, dimensions in the respective drawings have been overdrawn in part for the sake of description, and are not always coincident with those in reality.

Figure 2:
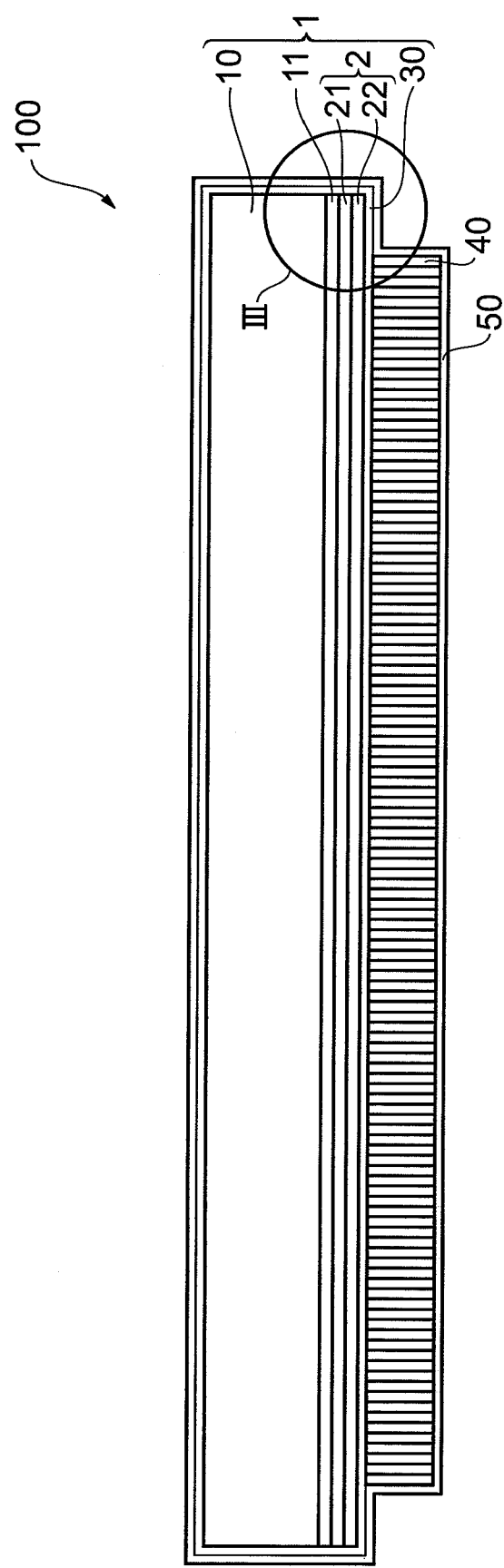
FIG. 2 is a sectional view along a line II-II thereof.
Figure 3:
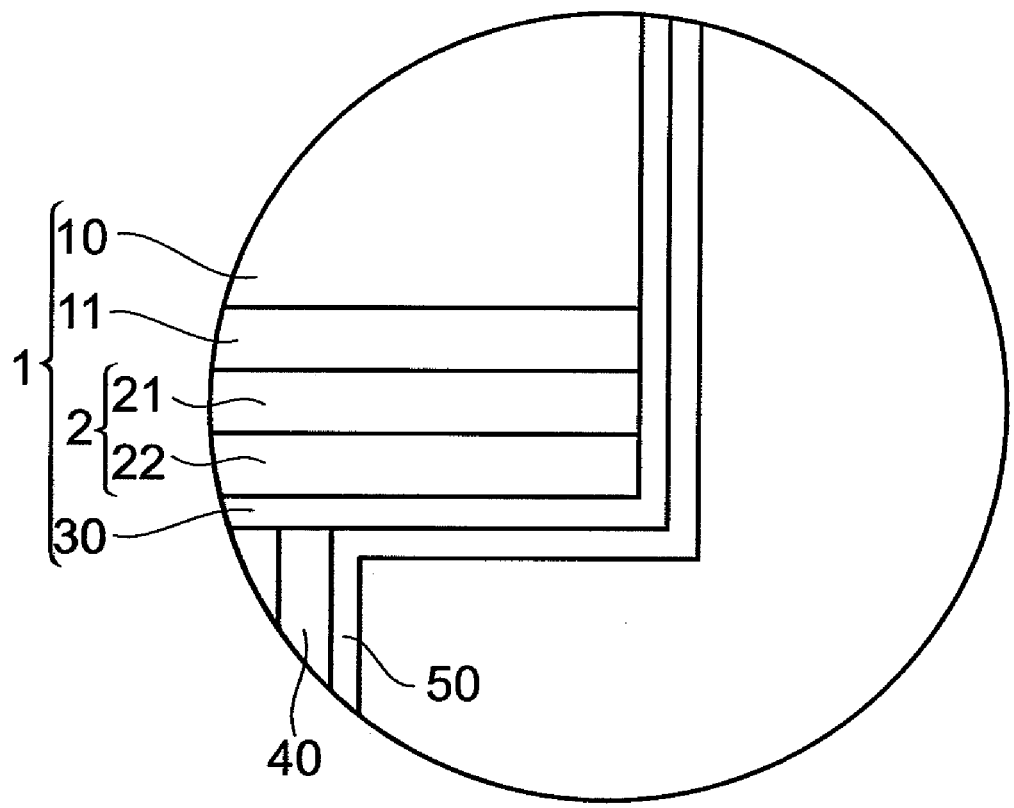
FIG. 3 is an enlarged view of a part III of FIG. 2.

FIG. 1 to FIG. 3 show a configuration of a first embodiment of a radiation image converting panel according to the present invention. The present embodiment is a scintillator panel using a scintillator as a converting portion of a radiation image and is therefore also a preferred embodiment of a scintillator panel according to the present invention. FIG. 1 is a partially broken perspective view thereof, FIG. 2 is a sectional view along a line II-II thereof, and FIG. 3 is an enlarged view of a part III of FIG. 2. This scintillator panel 100 is used for chest radiography and the like, and has a large size of, for example, 450 mm×450 mm. As its configuration, a metal reflection film 11 made of aluminum, a $SiO_2$ film 21, and a $TiO_2$ film 22 are laminated on one of the surfaces of an aluminum substrate 10. And, all of these including the aluminum substrate 10 are covered by a reflection protective film 30 to form a support 1. A needle-shaped scintillator 40 is provided on the surface of the reflection protective film 30 on the $TiO_2$ film 22 of the support 1, and further, the whole is covered by a moisture-resistant protective film 50.

The aluminum substrate 10 functions as a supporting substrate that supports the whole. When the thickness of the aluminum substrate 10 is less than 0.3 mm, the scintillator 40 tends to become easily peeled off due to curving of the aluminum substrate 10. On the other hand, when the thickness of the aluminum substrate 10 exceeds 1.0 mm, its radiation transmittance tends to decline. In order to secure intensity of radiation that is transmitted through this aluminum substrate 10 and made incident into the scintillator 40 while reliably forming the scintillator 40 on the substrate, it is preferable to provide the thickness of the aluminum substrate 10 as 0.3 mm or more and 11.0 mm or less.

As the metal reflection film 11, a thin film of gold, silver, aluminum, or the like can be used. The aluminum substrate 10 is usually formed by rolling, striped streaks are formed in the rolling process, and it is difficult to completely remove the streaks even by subsequent polishing. When the thickness of the metal reflection film 11 is less than 50 nm, unevenness tends to occur on the reflection surface under the influence of the stripes. On the other hand, when the thickness thereof exceeds 200 nm, its radiation reflectance tends to decline. In consideration of balance between the light reflectance of the metal reflection film 11 and intensity of radiation made incident into the scintillator 40, it is preferable to provide the thickness of the metal reflection film 11 as 50 nm or more and 200 nm or less. In the present embodiment, a thin aluminum film with a thickness of 70 nm is used, however, this may be analyzed as an incomplete aluminum oxide by an AES analysis (Auger Electron Spectroscopy).

Figure 4:
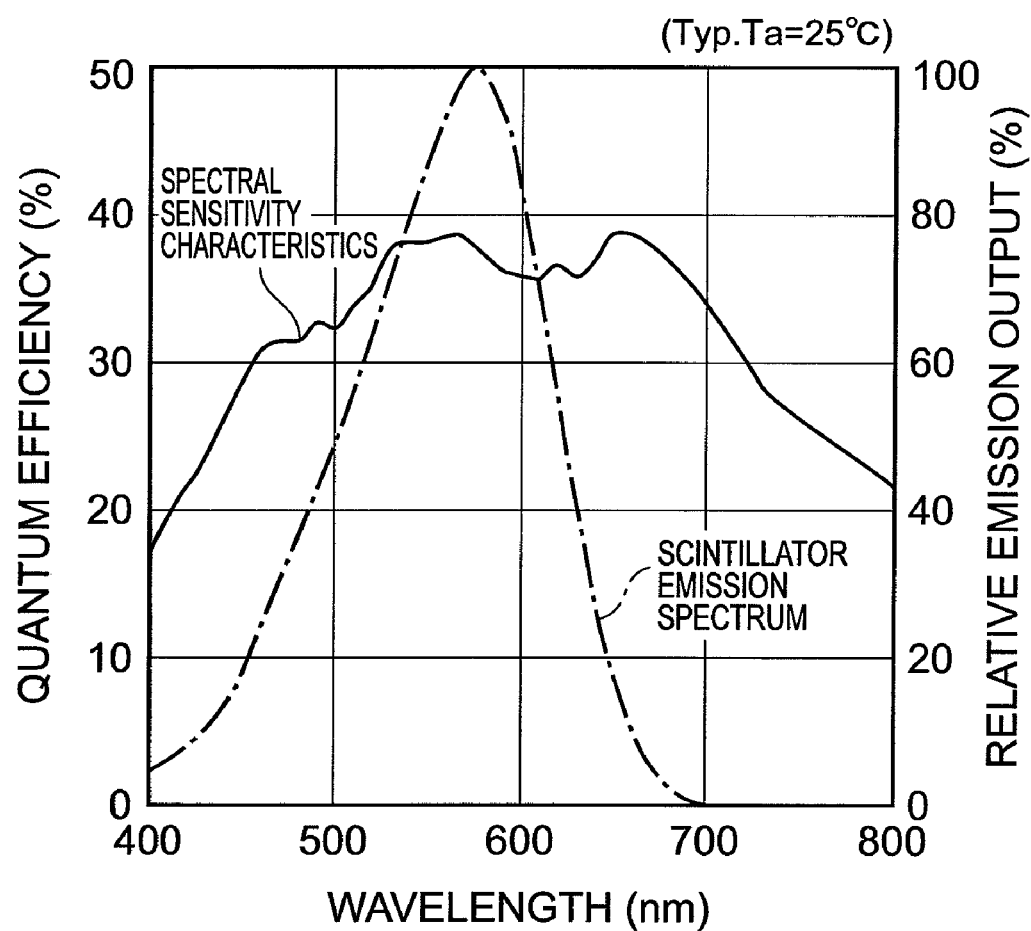
FIG. 4 is a graph showing an emission spectrum of a typical scintillator CsI (Tl) and a spectral sensitivity spectrum of a typical image sensor.

Both of the $SiO_2$ film 21 and the $TiO_2$ film 22 compose a dielectric film mirror 2. FIG. 4 is a graph showing an emission spectrum of the scintillator 40 of the present embodiment and spectral sensitivity characteristics of a MOS-type image sensor (C7921, manufactured by Hamamatsu Photonics K.K.), used in combination with the scintillator panel 100, for obtaining an optical image. As shown in this graph, since the emission spectrum of the scintillator 40 has a central emission wavelength around 560 nm, it is necessary for the dielectric film mirror 2 to have a high reflectance in a range centered on this wavelength. As for the refractive index to light with a wavelength of 560 nm, $SiO_2$ is 1.46 and $TiO_2$ is 2.29, and thus the refractive index of the $TiO_2$ film 22 being the second layer is higher than the refractive index of the $SiO_2$ film being the first layer. Since it is sufficient to set the film thickness of both so that its optical film thickness becomes $\lambda/4$ where a central wavelength of light to be reflected is provided as $\lambda$, it is sufficient to set the thickness of the $SiO_2$ film 21 to 95 nm and the thickness of the $TiO_2$ film to 60 nm. When a constituent of the scintillator 40 to be described later makes contact with the metal reflection film 11, this can cause erosion of the metal reflection film 11. The $SiO_2$ film 21 and $TiO_2$ film 22 existing between the metal reflection film 11 and scintillator 40 prevents contact of the constituent of the scintillator 40 with the metal reflection film 11, and also has a function to prevent erosion and deterioration thereof.

The reflection protective film 30 has a function to further prevent erosion and deterioration of the metal reflection film 11 due to the constituent of the scintillator 40. The $SiO_2$ film 21 and $TiO_2$ 22 described above are formed by vapor deposition as will be described later, and fine pinholes may occur at that time. In such a case, if the scintillator 40 is formed directly on the $TiO_2$ film 22, a constituent of the scintillator 40 reaches the metal reflection film 11 through the fine pinholes existing in the $SiO_2$ film 21 and $TiO_2$ film 22 to cause erosion and deterioration thereof. In the present embodiment, the reflection protective film 30 exists, so that even when pinholes have occurred at the time of a dielectric film formation, these openings can be effectively blocked to effectively inhibit the constituent of the scintillator 40 from reaching the metal reflection film 11. In addition, this can also efficiently inhibit the constituent of the scintillator 40 from reaching the metal reflection film 11 from the lateral side of the aluminum substrate 10.

On the other hand, since the scintillator 40 is generally formed of a deliquescent material, when the scintillator 40 is formed of such a deliquescent material, it is desirable to seal the scintillator 40 by the moisture-resistant protective film 50.

As the reflection protective film 30 and moisture-resistant protective film 50, an organic film or an inorganic film can be used, and different materials or the same material may be used. In the present embodiment, both films 30 and 50 are made from, for example, polyparaxylylene, but may be made from a xylylene-based material such as polymonochloroparaxylylene, polydichloroparaxylylene, polytetrachloroparaxylylene, polyfluoroparaxylylene, polydimethylparaxylylene, or polydiethylparaxylylene. Alternatively, the reflection protective film 30 and moisture-resistant protective film 50 may be made from, for example, polyurea, polyimide, or the like, or may be made from an inorganic material such as LiF, $MgF_2$, $SiO_2$, $Al_2O_3$, $TiO_2$, MgO, or SiN. Further alternatively, these may be formed in combination of an inorganic film and an organic film. In the present embodiment, the thickness of each protective film 30, 50 is 10 μm. The protective film 30 has a refractive index to light with a wavelength of 560 nm of 1.64, which is lower than the refractive index of the $TiO_2$ 22 being the second layer and higher than the refractive index of the $SiO_2$ film 21 being the first layer.

The scintillator 40 is smaller than the aluminum substrate 10 when viewed from the thickness direction of the aluminum substrate 10. In other words, the scintillator 40 is formed not on the whole of a scintillator 40 forming surface of the aluminum substrate 10 but in a partial region on the surface. The region of the surface of the aluminum substrate 10 formed with the scintillator 40 may be surrounded by regions formed without the scintillator 40 on four sides, however, regions formed without the scintillator 40 may exist only at three or two sides thereof and the scintillator 40 may be formed up to the ends of the substrate 10 on the other sides.

The scintillator 40 is made of, for example, a phosphor that converts radiation to a visible light, and is composed of CsI columnar crystals or the like doped with Tl, Na, or the like. The scintillator 40 has a construction bristled with a plurality of needle crystals. The scintillator 40 may be made of NaI doped with Tl, KI doped with Tl, or LiI doped with Eu. Alternatively, the scintillator 40 may be of a type that emits infrared or ultraviolet light other than visible light. The thickness of the scintillator 40 is preferably 100 μm to 1000 μm, and more preferably, 450 μm to 550 μm. The average needle diameter of the needle crystals that compose the scintillator 40 is preferably 3 μm to 10 μm.

Next, description will be given of a manufacturing process of this scintillator panel 100. First, the aluminum substrate 10 is prepared. Next, on this aluminum substrate 10, the metal reflection film 11 is formed by a vacuum vapor deposition method. Subsequently, the $SiO_2$ film 21 and $TiO_2$ film 22 are laminated similarly by a vacuum vapor deposition method. Then, the reflection protective film 30 is formed by a CVD method so as to seal the aluminum substrate 10, the metal reflection film 11, and the dielectric film mirror 2 as a whole. Subsequently, by a vapor deposition method, the scintillator 40 is formed at a predetermined position on the reflection protective film 30. Next, the moisture-resistant protective film 50 is formed by a CVD method so as to seal the whole of the aluminum substrate 10, the metal reflection film 11, and dielectric film mirror 2 sealed by the reflection protective film 30 and the scintillator 40 formed thereon altogether. In this manner, the scintillator panel 100 is manufactured. Here, sealing of the protective film 30, 50 can be realized by making the opposite surface side of the aluminum substrate 10 to the scintillator forming surface float up from a substrate holder that supports the substrate in the apparatus at the time of CVD. Such methods include a method described in, for example, the specification of U.S. Pat. No. 6,777,690. According to this method, pins are used to float the aluminum substrate 10. In this case, no protective film is formed on a minute contact surface between the aluminum substrate 10 and pins.

Figure 5:
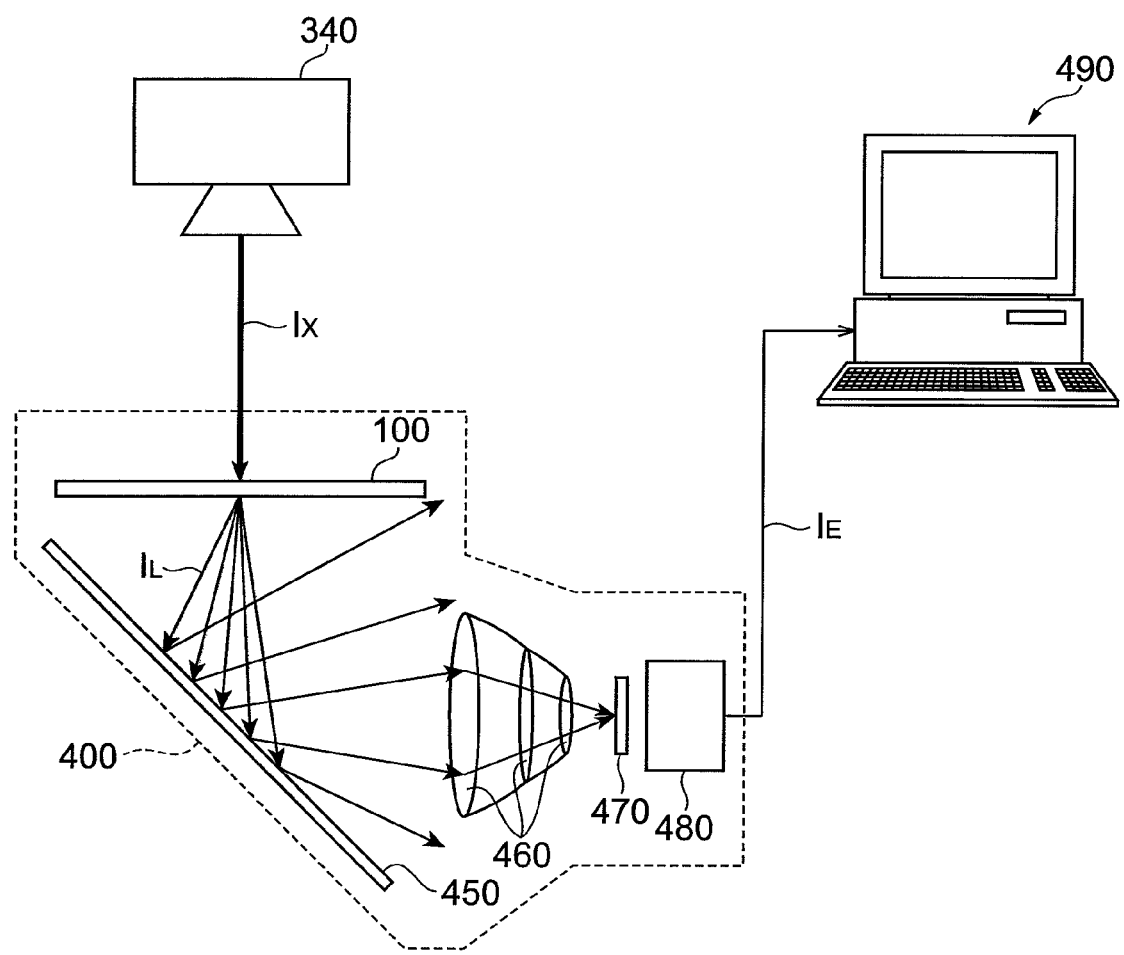
FIG. 5 is a schematic view showing a configuration of a radiation image sensor according to the present invention.

Next, we will describe actions and effects of this scintillator panel 100. This scintillator panel 100 is used as a part of a radiation image sensor. FIG. 5 is a schematic configuration view showing one embodiment (first embodiment) of a radiation image sensor (a radiation image sensor according to the present invention) using this scintillator panel.

This radiation image sensor 400 includes the scintillator panel 100 and an image pickup device 470 that converts an optical image $I_L$ emitted from the scintillator 40 of the scintillator panel 100 to an electrical signal $I_E$. Between the image pickup device 470 and the scintillator panel 100, arranged is a mirror 450 and a lens 460 as a reducing optical system that demagnifies an optical image $I_L$ and guides the image to an imaging plane of the image pickup device 470. The reducing optical system is not limited to the illustrated construction but may be composed only of either the mirror or lens, and the mirror and lens may be either a single or a plurality of mirrors and lenses. In addition, a prism and other optical components may be used besides the mirror and lens.

To describe the case of chest radiography for example, located as a subject is a reagent (not shown) between the surface (hereinafter, referred to as a "radiation input surface") of the scintillator panel 100 on the side where the scintillator 40 has not been formed and a radiation source 340. Radiation emitted from the radiation source 340 toward the reagent partially passes through the reagent, and an obtained radiation image $I_x$ is made incident into the radiation input surface of the scintillator panel 100.

The radiation made incident into the scintillator panel 100 passes through the moisture-resistant protective film 50, reflection protective film 30, the aluminum substrate 10, the metal reflection film 11, the dielectric film mirror 2, and the reflection protective film 30, and is made incident into the scintillator 40. The scintillator 40 emits visible light according to the radiation made incident. Thereby, a visible optical image $I_L$ according to the radiation image $I_X$ is generated.

A part of the visible light emitted from the scintillator 40 passes through the moisture-resistant protective film 50 and is outputted from the surface (hereinafter, referred to as a "optical image output surface") of the scintillator panel 100 on the side opposite to the radiation input surface. In addition, a part is outputted in the opposite direction, that is, to the dielectric film mirror 2 side, but is reflected by the reflection protective film 30, the dielectric film mirror 2, and the metal reflection film 11 to return to the scintillator 40 side, and is finally outputted from the optical image output surface after passing through the scintillator 40 and the moisture-resistant protective film 50.

Since the scintillator panel 100 of the present embodiment employs the thin aluminum substrate 10, this allows securing intensity of radiation made incident into the scintillator 40 to obtain a radiation image (in actuality, the optical image $I_L$ corresponding to the radiation image $I_X$) with a high intensity. In addition, since light emitted from the scintillator 40 is effectively guided by the reflection protective film 30, the dielectric film mirror 2, and the metal reflection film 11 to the optical image output surface to be outputted, intensity of the output optical image can be further increased. Since this allows obtaining an optical image corresponding to a radiation image with a sufficient intensity even when the intensity of light made incident is low, the amount of radiation made incident into the subject can be reduced, and an effect to lower the amount of radiation exposure of the subject can also be obtained.

The optical image $I_L$ outputted from the scintillator panel 100 is demagnified by the mirror 450 and the lens 460 and is guided to the imaging plane of the image pickup device 470. As the image pickup device 470, besides, for example, a solid-state image pickup device such as a CCD (Charge-Coupled Device) or a CMOS (Complementary Metal Oxide Semiconductor) device, a pickup tube or the like can be used.

The image pickup device 470 outputs the electrical signal $I_E$ according to the optical image $I_L$ made incident from the imaging plane. The outputted electrical signal $I_E$ is sent to an analyzing workstation 490 through an electronic device 480, and is applied with a predetermined processing to display an image onto a display or accumulate/store image information onto a storage device such as hard disk. The electrical signal $I_E$ corresponding to the image may be sent as an analog signal to the workstation 490 or may be converted to a digital signal by the electronic device 480 or the image pickup device 470 itself. The electronic device 480 may apply, without limitation to digitization, other processes to the obtained electrical signal $I_E$. In addition, the electronic device 480 may control operation of the image pickup device 470. In the present embodiment, using the reducing optical system provides an advantage that a small-sized image pickup device can be used as the image pickup device 470.

Figure 6:
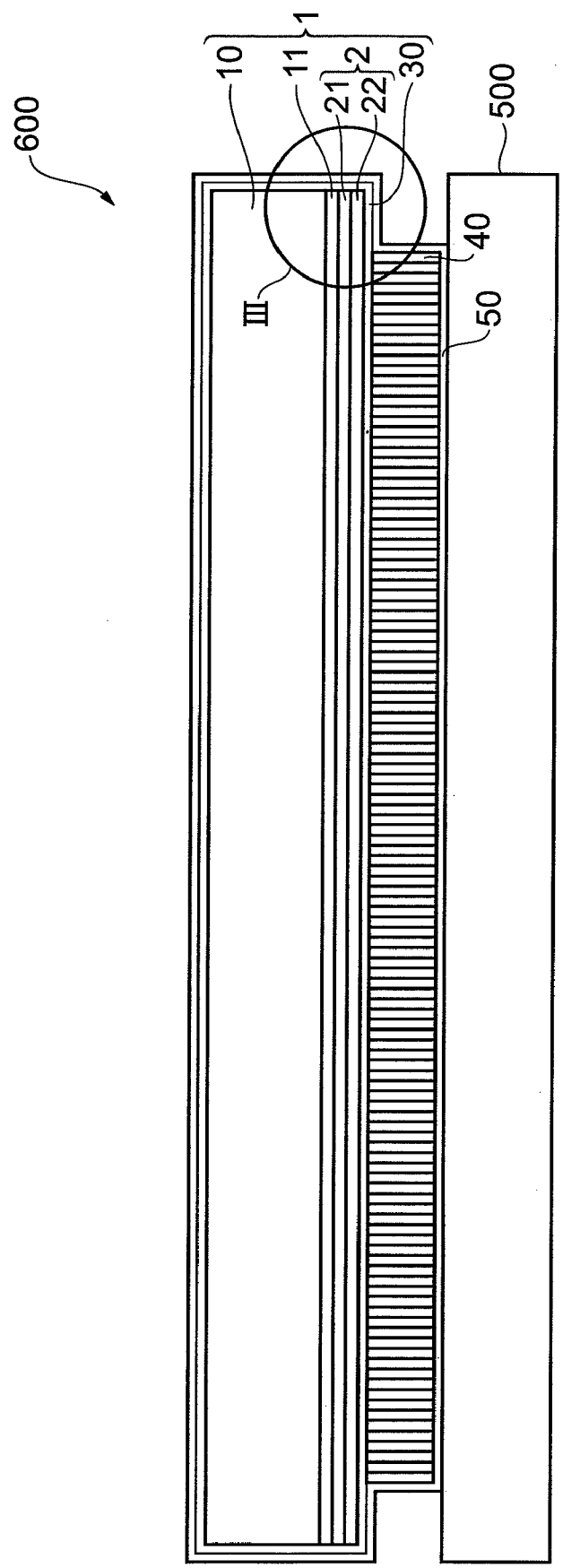
FIG. 6 is a sectional view showing another configuration.

The radiation image sensor using the scintillator panel 100 of the present embodiment is not limited to the embodiment mentioned above. FIG. 6 is a sectional view showing a configuration of another radiation image sensor using the scintillator panel 100 of the present embodiment. A radiation image sensor 600 of this embodiment includes the scintillator panel 100 and an image pickup device 500 which is arranged in a manner opposed thereto and converts light outputted from the scintillator 40 of the scintillator panel 100 to an electrical signal. Here, the optical image output surface of the scintillator panel 100 is arranged on the imaging plane side of the image pickup device 500 side. That is, the scintillator 40 is arranged between the image pickup device 500 and the substrate 10. The scintillator panel 100 and the image pickup device 500 may be joined or may not be joined to each other. In addition, it is not always necessary that these are in contact, and these may be arranged apart. When both are joined, these may be joined by an adhesive, or an optical coupling material (refractive index matching material) may be used to lower a light loss so that emitted light is efficiently guided to the imaging plane of the image pickup device 500 in consideration of the refractive indices of the scintillator 40 and the protective film 50. In addition, both may be mechanically combined by use of an unillustrated fixing member.

Similar to the radiation image sensor of the first embodiment, in the present embodiment as well, a radiation image made incident from the radiation input surface is converted to an electrical signal by being made incident into the scintillator 40, is converted to an optical image, and is guided to the image pickup device 500. By guiding this electrical signal to an unillustrated analyzing device, a display, accumulation/storage, or the like can be performed, and the same effects as those of the radiation image sensor of the first embodiment can be obtained. In the present embodiment, since the scintillator panel 100 and the image pickup device 500 can be integrated, handling thereof becomes easy, and there is also an advantage that omitting an optical system makes an adjustment easy.

Figure 7:
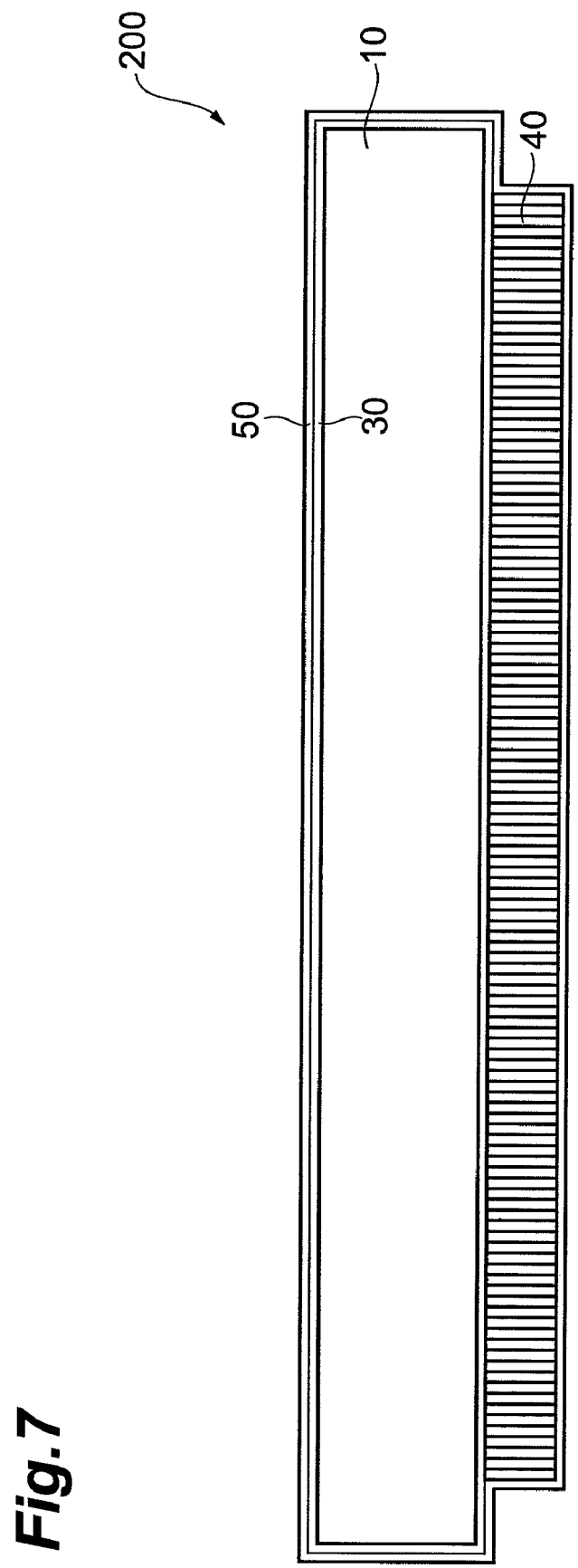
FIG. 7 is a sectional view showing a configuration of a scintillator panel to be a comparative example.

Next, we will describe verification results of the difference in effects depending on the existence of the dielectric film mirror 2 of the scintillator panel 100 of the present embodiment. FIG. 7 is a sectional view showing a configuration of a scintillator panel 200 to be a comparative example. This scintillator panel 200 has a configuration provided by sealing the aluminum substrate 10 by the protective film 30, forming the scintillator 40 on one of the surfaces thereof, and covering the whole by the moisture-resistant protective film 50 while excluding the metal reflection film 11 and the dielectric film mirror 2 from the scintillator panel 100 according to the present embodiment, and other aspects of the configuration are the same as those of the scintillator panel 100.

Figure 8:
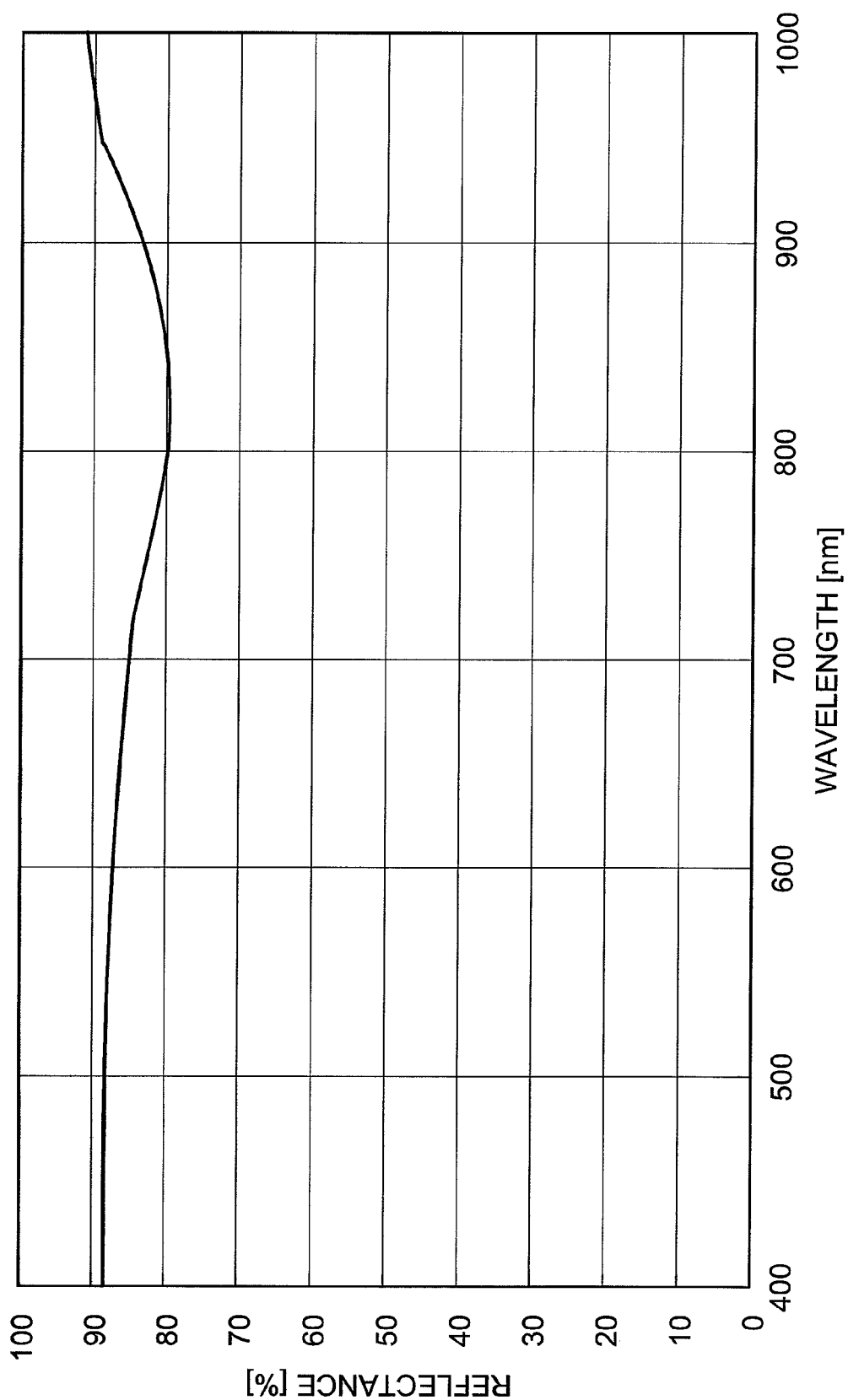
FIG. 8 is a graph showing wavelength characteristics of light reflectance at an interface of the scintillator panel.

FIG. 8 is a graph showing a spectral reflectance at the scintillator 40 forming surface of the substrate 10 and the protective film 30 viewed from the scintillator 40 side in the scintillator panel 200 of FIG. 7. It can be understood that there is an absorption loss of slightly over 10% although the surface has a reflectance of 80% to 90% from the visible light region to the near-infrared light region.

Figure 9A:
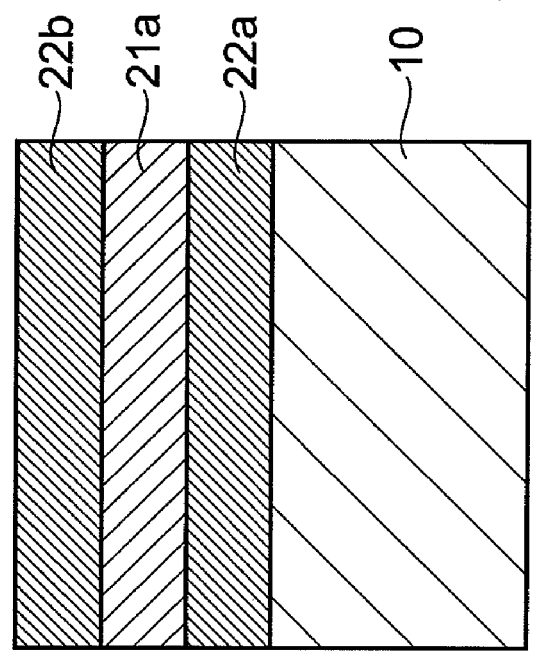
FIG. 9A is a view showing a lamination order of a dielectric layer in a scintillator panel according to the present invention.
Figure 9B:
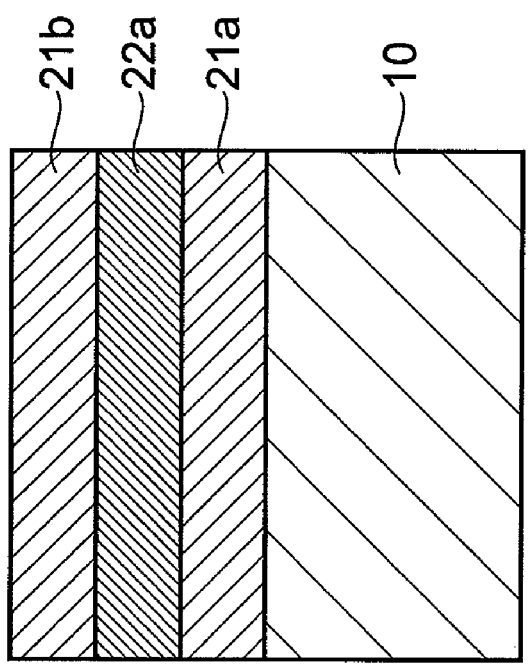
FIG. 9B is a view showing a lamination order of a dielectric layer in the comparative example.

Next, we will describe the case where the dielectric film mirror 2 is provided. FIG. 9A and FIG. 9B show dielectric mirror parts of scintillator panels, where both of these employ a construction of the $SiO_2$ film 21 and the $TiO_2$ film 22 alternately laminated on the aluminum substrate 10, and these are different only in the lamination order thereof. In the dielectric mirror shown in FIG. 9A, as in the scintillator panel 100 according to the present embodiment, a $SiO_2$ film 21a with a low refractive index is provided as a first layer on the aluminum substrate 10 and a $TiO_2$ film 22a with a high refractive index is thereon provided as a second layer, and this is then repeated. On the other hand, in the dielectric mirror shown in FIG. 9B, contrary thereto, a $TiO_2$ film 22a with a high refractive index is provided as a first layer on the aluminum substrate 10 and a $SiO_2$ film 21a with a low refractive index is thereon provided as a second layer, and this is then repeated.

Figure 11:
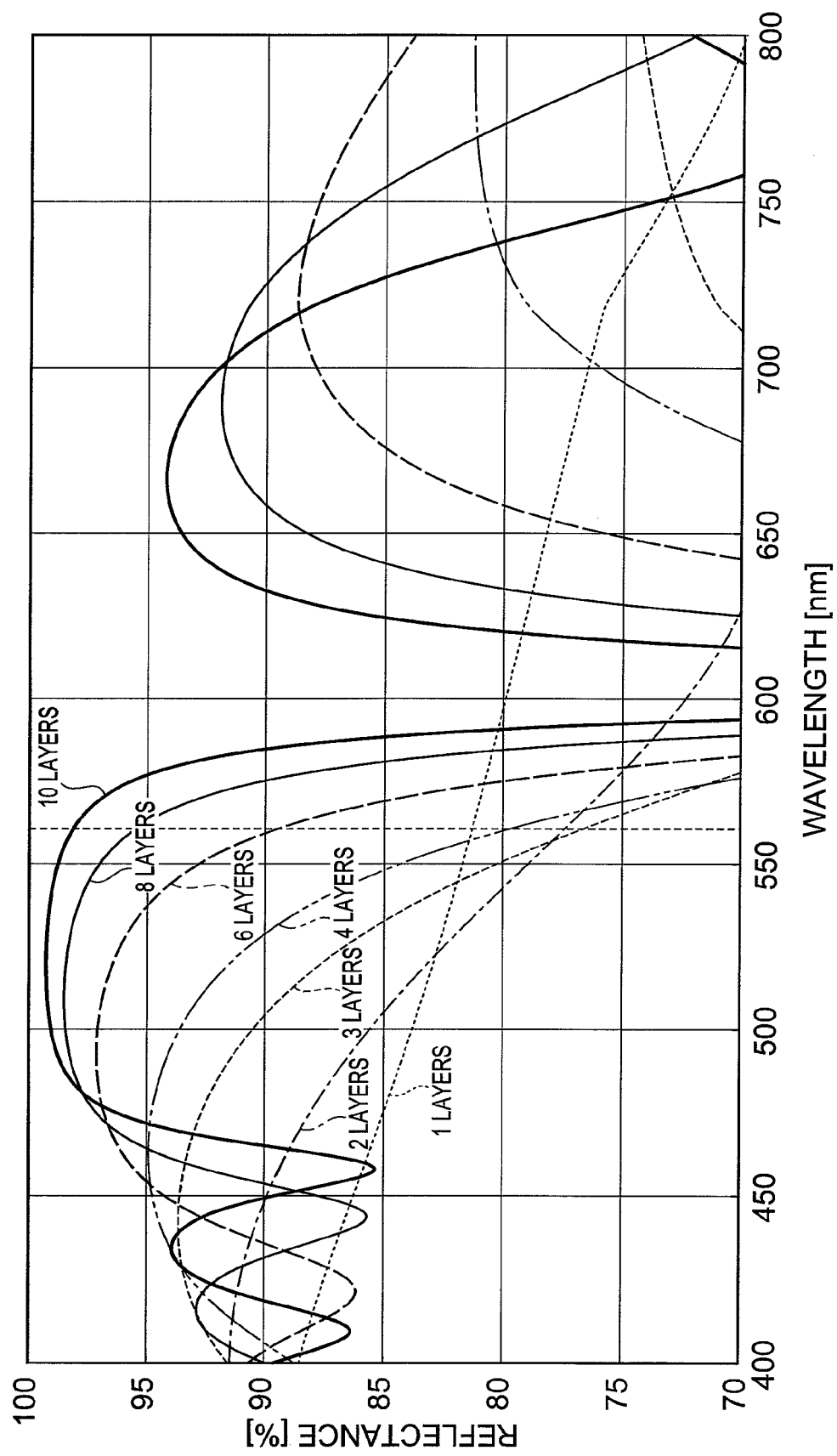
FIG. 11 is a graph showing wavelength characteristics of light reflectance of the dielectric layer shown in FIG. 9B.

FIG. 10 and FIG. 11 show spectral reflectances in cases of the respective constructions of FIG. 9A and FIG. 9B. According to the construction of FIG. 9A, a reflectance of nearly 95% can be obtained even when the dielectric mirror is composed of two layers as in the present embodiment, the reflectance exceeds 99% with six layers, and a reflectance of 99.8% is obtained with ten layers. According to the construction of FIG. 9B, a phenomenon of a great depression of the reflectance is recognized around 600 nm. In the emission spectrum of the scintillator 40 (see FIG. 4), the amount of energy in this region where the reflectance is depressed is not negligible, so that the intensity of an optical image to be obtained becomes lower than that of the construction of FIG. 9A.

Figure 12:
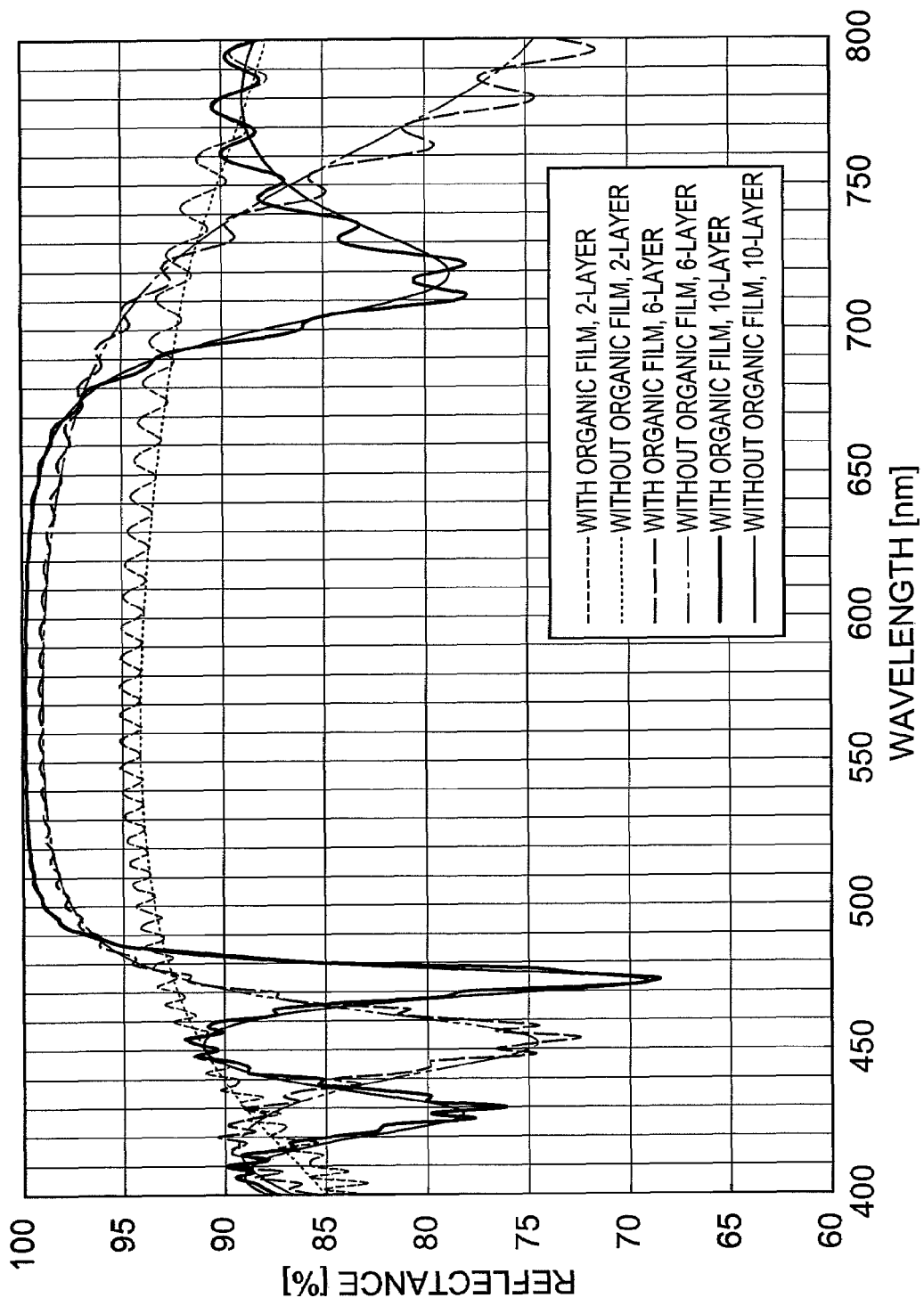
FIG. 12 is a graph showing wavelength characteristics of light reflectance in cases with and without an organic film provided on the surface of the dielectric layer shown in FIG. 9A.

FIG. 12 is a graph showing by comparison spectral reflectances when, in the construction of FIG. 9A, the protective film 30 is provided and not provided on the surface thereof. As shown in FIG. 12, although the reflectance has a tendency to fluctuate finely and periodically when an organic film is formed in comparison with when no organic film is provided, it can be understood that the reflectance as a whole has been improved. Table 1 shows the difference in light reflectance at a wavelength of 560 nm to the number of laminations of dielectric layers in this construction.

TABLE 1

| Light reflectance by number of layers | |
|---|---|
| Number of layers | Reflectance (%) |
| 0 | 87.75 |
| 1 | 90.00 |
| 2 | 94.61 |
| 3 | 95.69 |
| 4 | 97.76 |
| 5 | 98.21 |
| 6 | 99.08 |
| 7 | 99.27 |
| 8 | 99.63 |
| 9 | 99.71 |
| 10 | 99.85 |

It can be understood from this table that an effect to improve reflectance when the $TiO_2$ film serving as an even number layer was laminated is larger than the effect to improve reflectance when the $SiO_2$ film 21 serving as an odd number layer was laminated. Therefore, in consideration of cost performance etc., it is preferable to provide the number of laminations as an even number.

Figure 13:
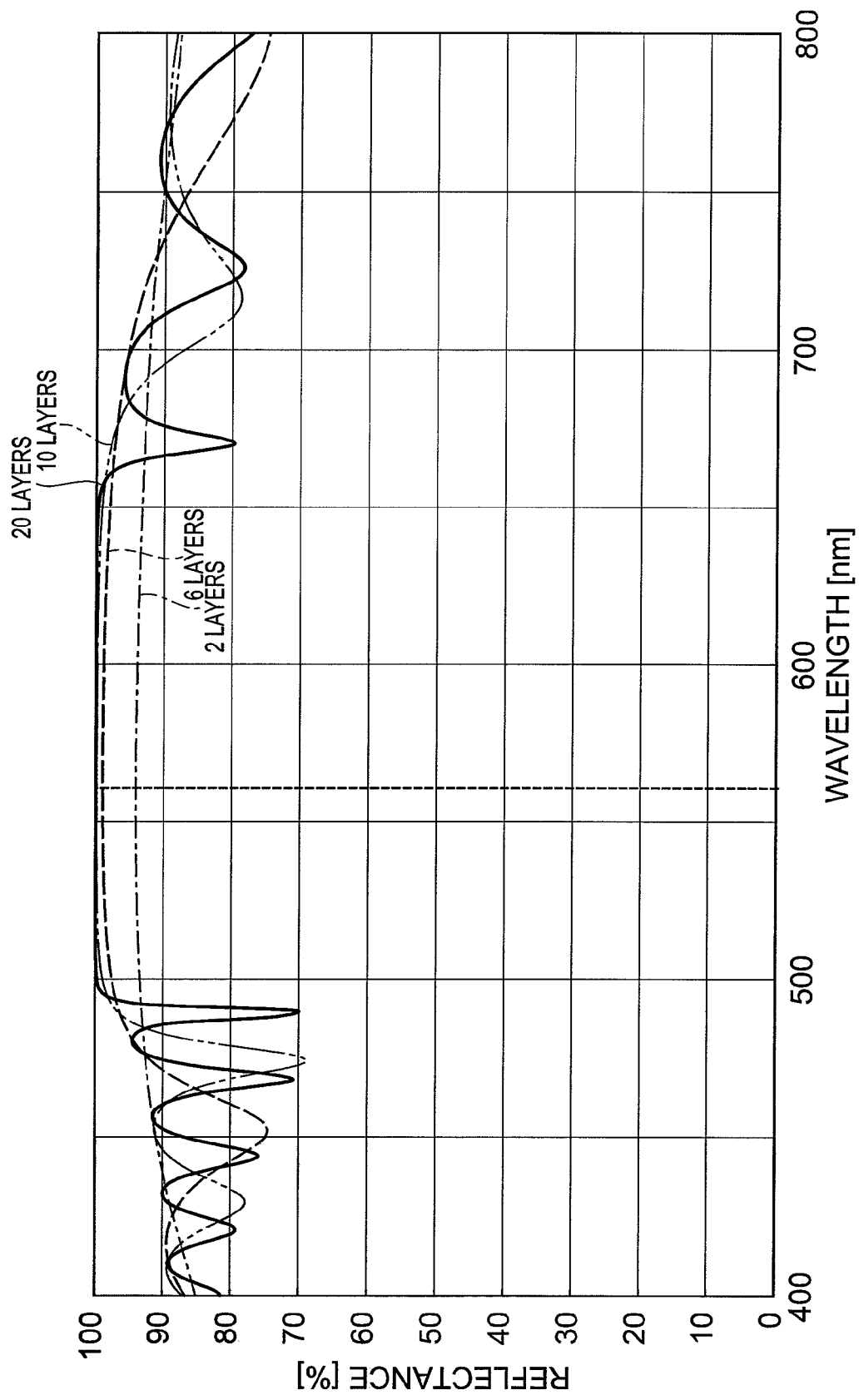
FIG. 13 is a graph showing wavelength characteristics of light reflectance in cases where the substrate is made of aluminum in the scintillator panel having the configuration shown in FIG. 9A.
Figure 14:
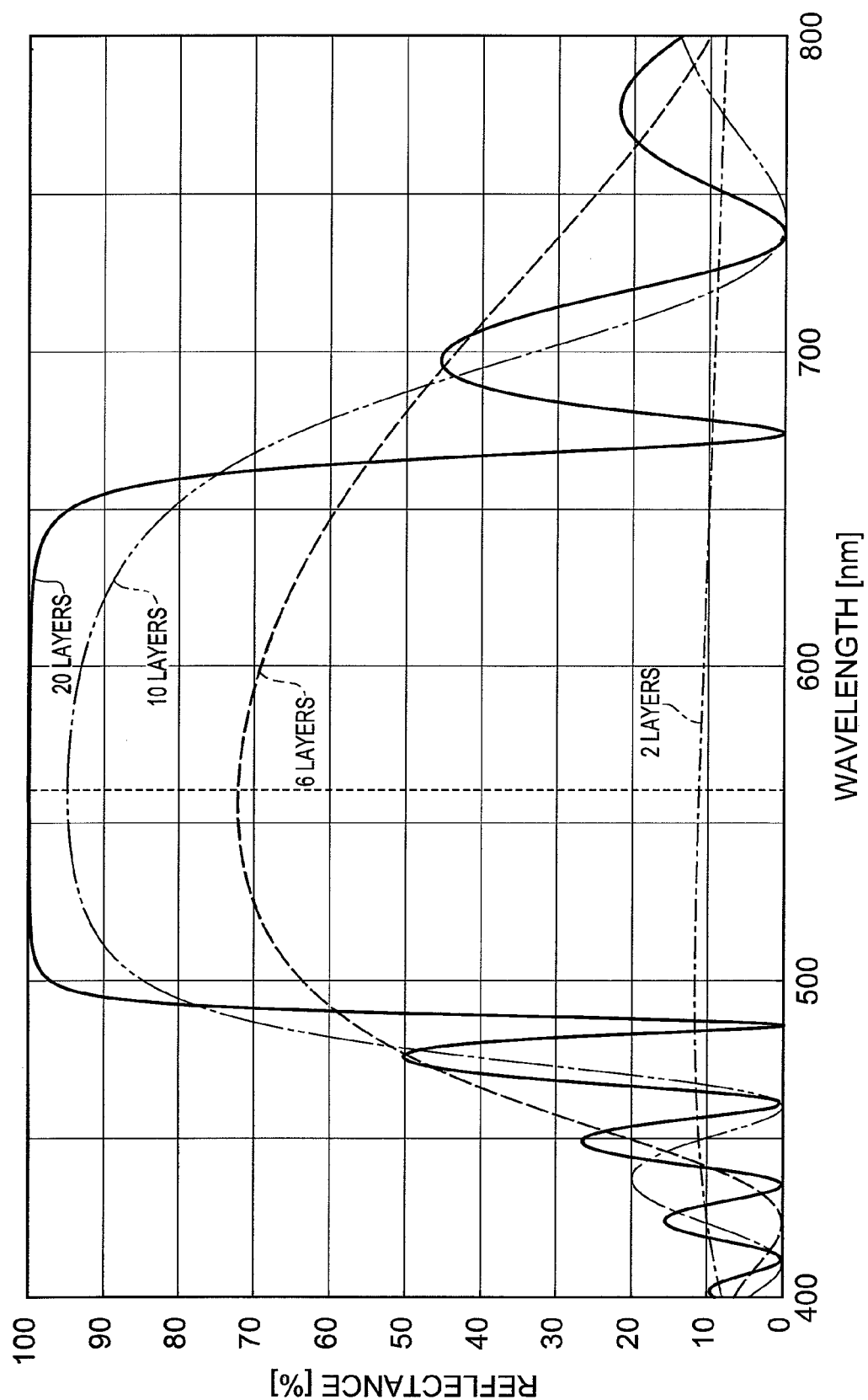
FIG. 14 is a graph showing wavelength characteristics of light reflectance in cases where the substrate is made of glass.

FIG. 13 and FIG. 14 are graphs showing by comparison spectral reflectances by the material of the substrate 10 in FIG. 9A. FIG. 13, which shows spectral reflectances in the case of the substrate 10 shown in FIG. 9A, is a simplified graph of FIG. 10. FIG. 14 shows spectral reflectances when the substrate 10 shown in FIG. 9 was replaced by a glass substrate. It can be understood that there is virtually no difference therebetween when the number of layers is large (20 layers), however, the spectral reflectance receives an influence of the substrate layer when the number of layers is small. Accordingly, it has been confirmed to be preferable that the first layer of the dielectric mirror is formed on a light reflection surface as shown in the present embodiment when the number of layers is small.

As has been described above, although it is preferable that the number of layers of the dielectric films is large for improving reflecting characteristics thereof, since a reflectance of nearly 95% can be obtained even with two layers and a reflectance of 99.85% can be obtained with ten layers, the effect to improve reflectance to be provided by further multilayered dielectric films is small. Meanwhile, the materials composing the dielectric films are poor in flexibility, elasticity, and ductility. During a manufacturing process of the scintillator panel 100 of the present embodiment, a warp on the order of a few millimeters to a few tens of millimeters can occur in the substrate 10 due to a formation of the scintillator 40, however, the dielectric films are poor in resistance to distortion caused by this warp, and an inconvenience such that a crack is produced can occur. The larger the number of layers and the layer thickness of the dielectric films, the more likely a crack will occur, so that it is preferable that the thickness does not exceed approximately 1 μm. Therefore, the dielectric films can realize both mass producibility and a high reflectance when these are provided on the order of ten layers or less in terms of the number of layers and at 1 μm or less in terms of the thickness.

Figure 15:
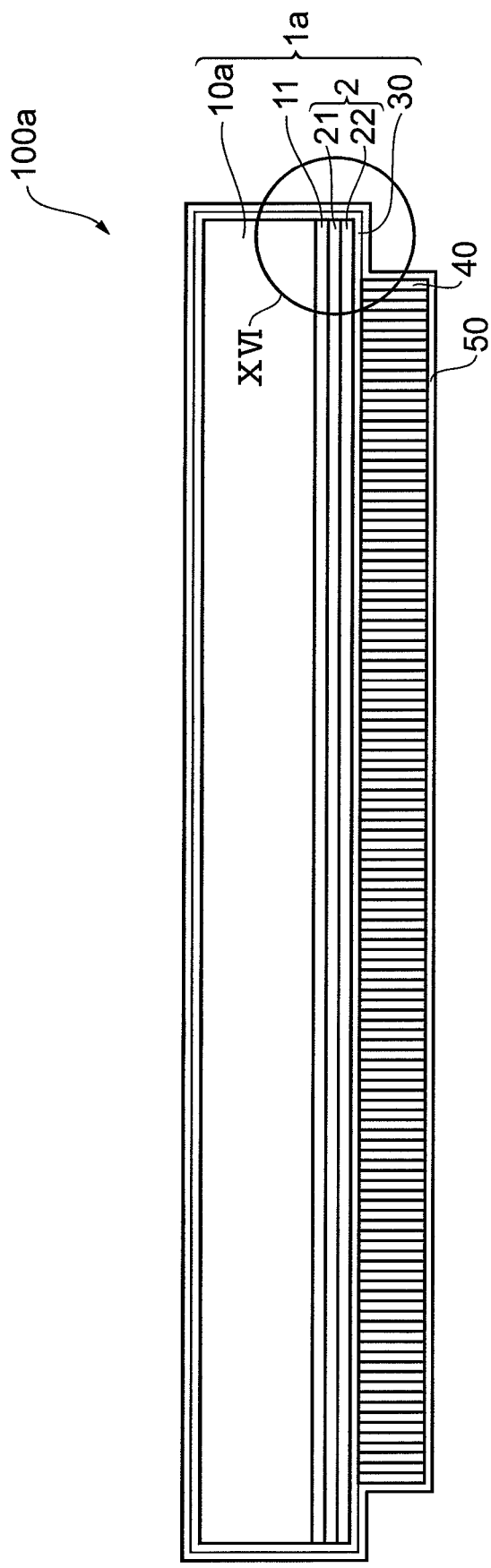
FIG. 15 is a sectional view showing a configuration of a second embodiment of a scintillator panel according to the present invention.
Figure 16:
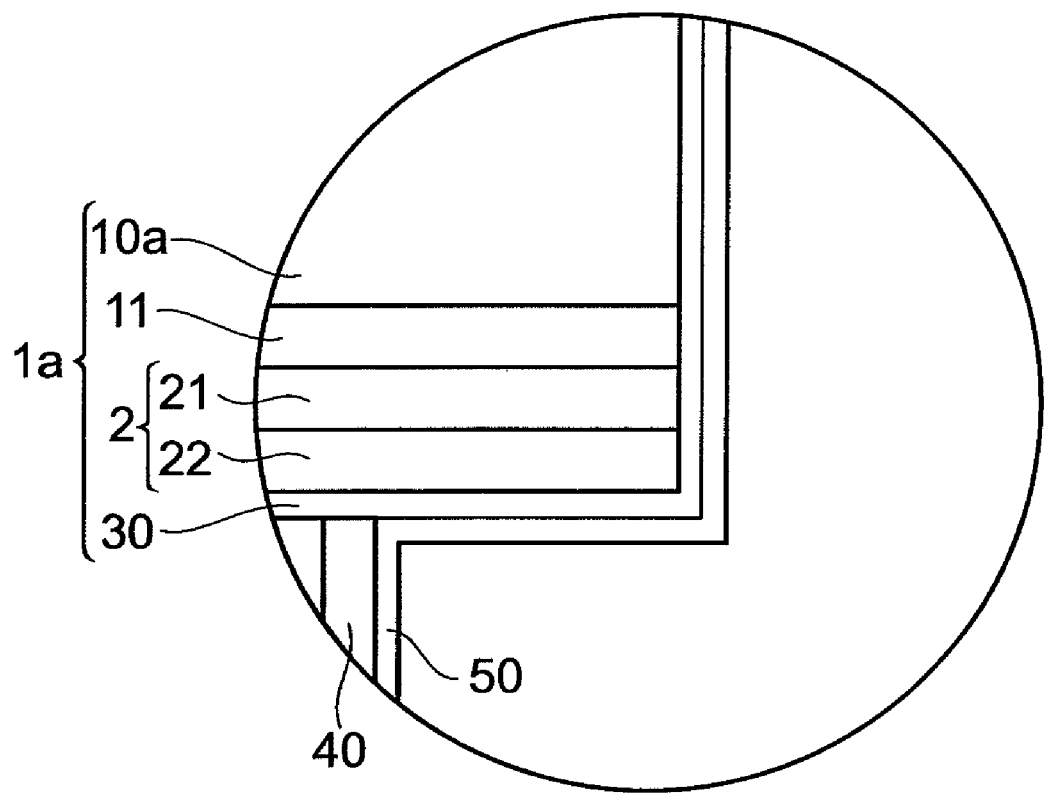
FIG. 16 is an enlarged view of a part XVI thereof.

Hereinafter, we will describe some different embodiments of a scintillator panel according to the present invention. FIG. 15 is a sectional view showing a configuration of a second embodiment of a scintillator panel according to the present invention, and FIG. 16 is an enlarged view of a part XVI thereof. The configuration of this scintillator panel 100a is basically the same as that of the scintillator panel 100 of the first embodiment shown in FIG. 2 and FIG. 3, and differs only in the point that an amorphous carbon substrate 10a is used in a support 1a in place of the aluminum substrate 10. In the amorphous carbon substrate 10a as well, for the same reason as that of the first embodiment, it is preferable to provide the thickness as 0.3 mm or more and 1.0 mm or less. In this embodiment as well, an optical image with a high intensity can be obtained as in the first embodiment. Since the amorphous carbon substrate has a higher radiation transmittance than that of the aluminum substrate, a more satisfactory optical image can be obtained.

Figure 17:
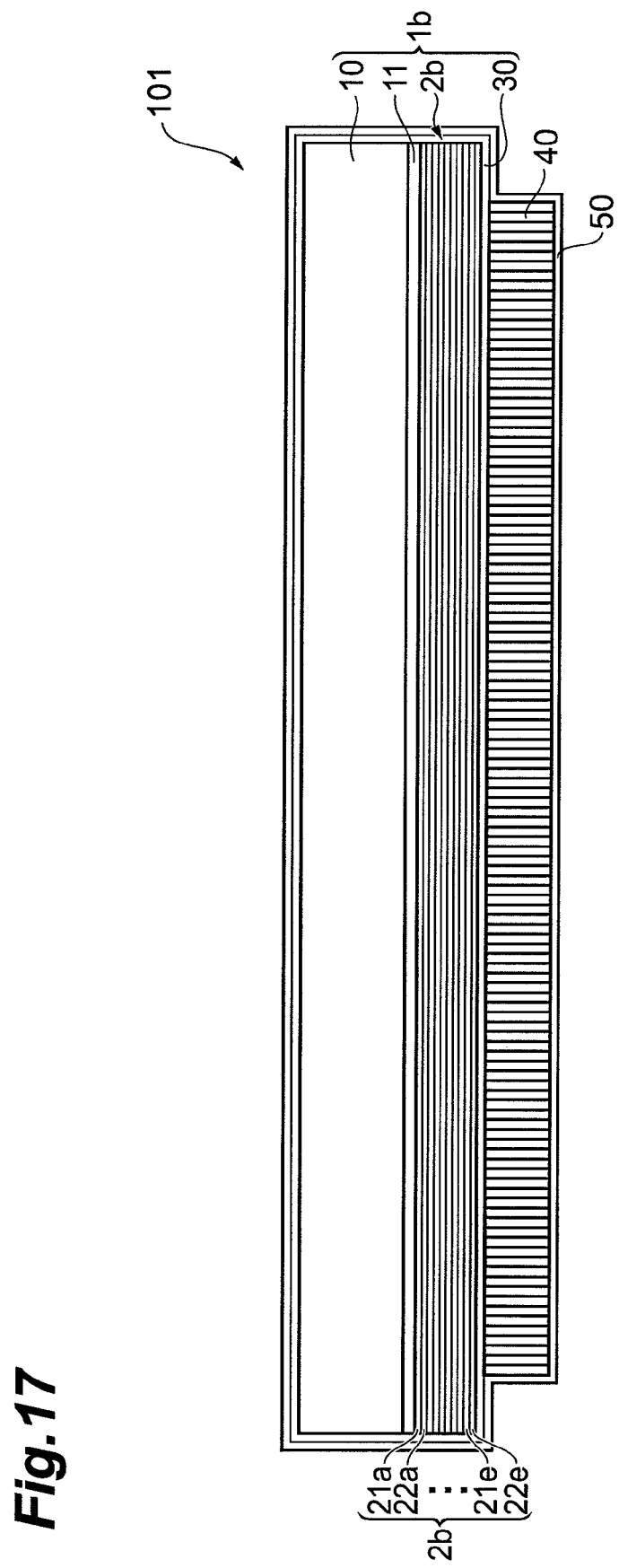
FIG. 17 to FIG. 19 are sectional views showing respective configurations of third to fifth embodiments of a scintillator panel according to the present invention.

FIG. 17 is a sectional view showing a configuration of a third embodiment of a scintillator panel according to the present invention. This scintillator panel 101 differs only in the point that a ten layered dielectric film mirror 2b is used in place of the dielectric film mirror 2 of the first embodiment. As a lamination order of the dielectric film mirror 2b, as in the dielectric film mirror 2 of the first embodiment, the $SiO_2$ film 21a with a low refractive index is provided as a first layer on the metal reflection film 11 and the TiO$_2$ film 22a with a high refractive index is thereon provided as a second layer, and then the lamination of the SiO$_2$ film and TiO$_2$ film is repeated four times. As in the first embodiment, the thickness of the SiO$_2$ films 21a to 21e is 95 nm, and the thickness of the TiO$_2$ films 22a to 22e is 60 nm. According to the present embodiment, since a reflection layer with a high reflectance of 99.85% can be realized as shown in FIG. 12 and Table 1, an optical image with a higher intensity can be obtained. Meanwhile, even when more than ten dielectric layers are laminated, the improvement in reflectance is slight, and the difficulty in lamination is increased, the yield of products and the like is also lowered, and the manufacturing cost is also increased, and thus a lamination of more than ten layers is not preferable.

Figure 18:
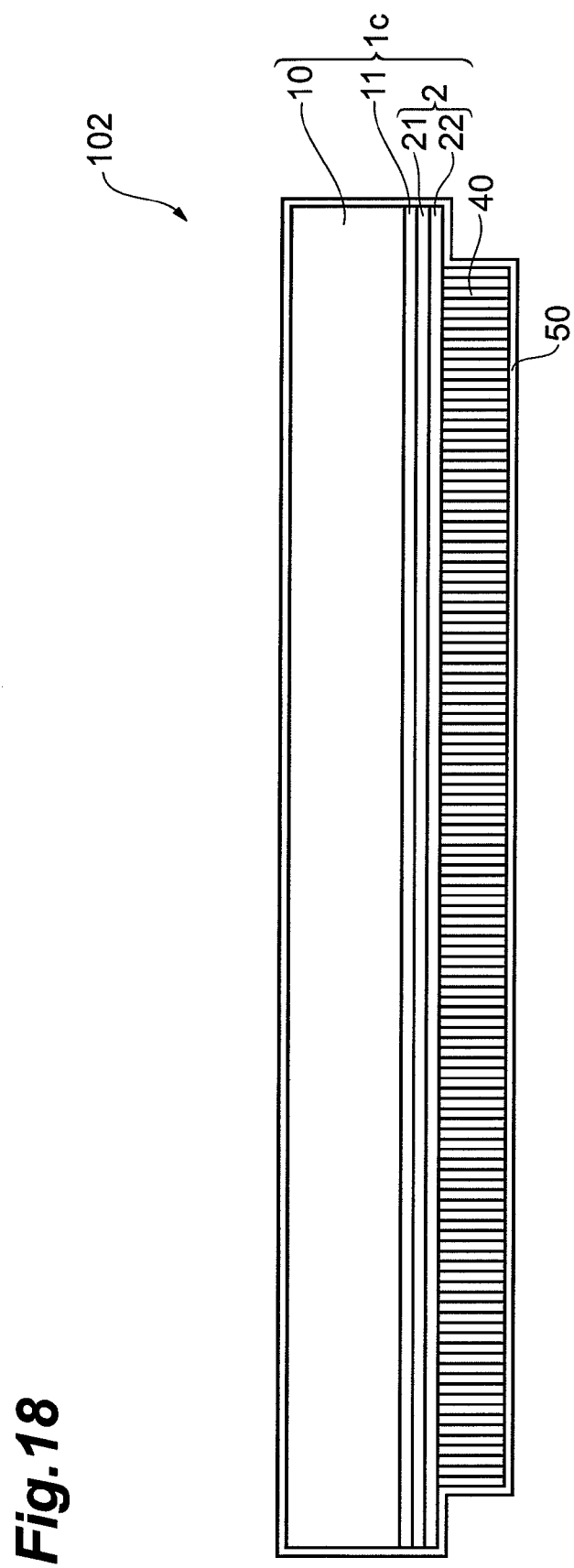

FIG. 18 is a sectional view showing a configuration of a fourth embodiment of a scintillator panel according to the present invention. This scintillator panel 102 differs only in the point that the reflection protective film 30, which has been provided in the first embodiment, is excluded from a support 1c. Although it is more preferable to provide the reflection protective film 30 as in the first embodiment in consideration of the point of protecting the metal reflection film 11 from deterioration due to the scintillator constituent and the point that the reflectance is slightly improved, the reflection protective film 30 is not an essential component of the present invention. In the present embodiment, two dielectric layers compose the dielectric film mirror 2, and since these two dielectric layers function as a protective film, deterioration of the metal reflection film 11 due to the scintillator constituent can be effectively inhibited even without the exclusive protective film 30.

Figure 19:
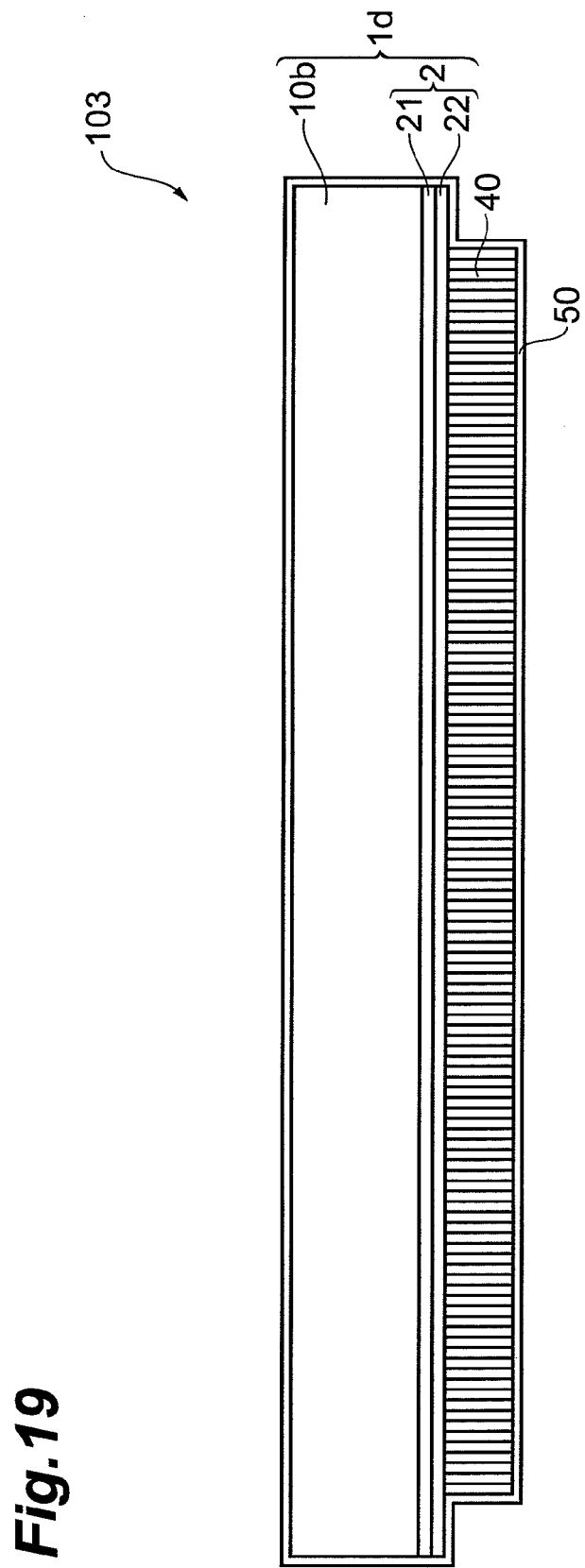

FIG. 19 is a sectional view showing a configuration of a fifth embodiment of a scintillator panel according to the present invention. This scintillator panel 103 is provided by further excluding the metal reflection film 11 of a support 1d from the fourth embodiment. Smoothing the surface of the aluminum substrate 10 into a mirror surface makes it possible to provide the surface of the substrate 10 with the same function as the metal reflection film. Also, even in an incompletely mirrored state, the surface can be made to function as a reflection surface as long as a sufficient reflectance can be obtained. According to the present embodiment, a radiation image with a high intensity can be obtained by a simple configuration. Another metal substrate whose surface has light reflectivity may be used in place of the aluminum substrate. As metals other than aluminum, for example, gold, silver, and the like can be preferably used since the reflectance is high.

The present invention is not limited to the configurations of the above embodiments, and also includes combinations of the respective embodiments and replacements thereof, etc. For example, in the third and fourth embodiments, the substrate may be replaced by a substrate made of a metal other than aluminum, and further, this can be replaced by another radiation-transmissive substrate such as an amorphous carbon substrate, a silicon substrate, or a glass substrate.

In the above embodiments, SiO$_2$ has been used as the material of the first layer (low-refractive index layer) of the dielectric film layers, and as the material of the second layer (high-refractive index layer), TiO$_2$, however, other materials may be used. As the material of the high-refractive index layer, a material containing at least one of the materials including TiO$_2$ as well as Nb$_2$O$_5$, Ta$_2$O$_5$, HfO$_2$, and ZrO$_2$ can be used, for example.

In addition, stability of the metal reflection film may be improved by, for example, providing an inorganic or organic film such as an oxide film between the substrate and metal reflection film. As a method for forming an oxide film, besides a method for forming an oxide film on the substrate by vapor deposition or the like, if the substrate is made of a metal, an oxide film may be formed by oxidizing the substrate surface.

Although the scintillator panel has herein been exemplified as a radiation image converting panel, a photostimulable phosphor such as CsBr doped with Eu may be used as a converting portion that converts a radiation image to an optical image to replace the scintillator. A radiation image is once converted by the photostimulable phosphor to a latent image, and a visible optical image can be read out by scanning this latent image with a laser light. The visible optical image thus read out is detected by various photodetectors such as, for example, a line sensor, an image sensor, and a photomultiplier.

What is claimed is:

1. A radiation image converting panel including a converting portion that converts a radiation image to an optical image on a support,
the support comprising:
a metal reflector; and
a dielectric film mirror including at least a first dielectric layer which is in contact with the metal reflector and formed thereon and a second dielectric layer which is formed on the first dielectric layer and has a higher refractive index than that of the first dielectric layer to light of an optical image outputted from the converting portion, wherein the converting portion is formed on the dielectric film mirror side.

2. A scintillator panel for which a scintillator composed of a plurality of needle crystals is formed on a support, the support comprising:
a metal reflector; and
a dielectric film mirror including at least a first dielectric layer which is in contact with the metal reflector and formed thereon and a second dielectric layer which is formed on the first dielectric layer and has a higher refractive index than that of the first dielectric layer to light emitted from the scintillator, wherein the scintillator is formed on the dielectric film mirror side.

3. The scintillator panel according to claim 2, wherein the first
dielectric layer contains SiO2, and the second dielectric layer contains at least one material from TiO$_2$, Nb$_2$O$_5$, Ta$_2$O$_5$, HfO$_2$, and ZrO$_2$.

4. The scintillator panel according to claim 3, wherein the dielectric film mirror is formed by laminating three or more layers of the first dielectric layer and the second dielectric layer alternately.

5. The scintillator panel according to claim 4, wherein a number of laminations of the dielectric film mirror is 10 layers or less.

6. The scintillator panel according to claim 4, wherein a thickness of the dielectric film mirror as a whole is 1 μm or less.

7. The scintillator panel according to claim 2, further comprising a transparent organic film which is formed, on the dielectric film mirror, at least between the dielectric film mirror and the scintillator, and has a lower refractive index than that of the second dielectric layer to light emitted by the scintillator.

8. The scintillator panel according to claim 2, wherein the metal reflector is a thin metal film.

9. The scintillator panel according to claim 8, further comprising a supporting substrate that supports the metal reflector.

10. The scintillator panel according to claim 2, wherein the metal reflector is a metal substrate.

11. The scintillator panel according to claim 8 or 10, wherein the metal reflector is formed of aluminum, silver, or gold.

12. A radiation image sensor comprising:

a radiation image converting panel for which a converting portion that converts a radiation image to an optical image is formed, of a support including a metal reflector and a dielectric film mirror including at least a first dielectric layer which is in contact with the metal reflector and formed thereon and a second dielectric layer which is formed on the first dielectric layer and has a higher refractive index than that of the first dielectric layer to light of the optical image formed on the first dielectric film layer, on the dielectric film mirror side; and an image pickup device that converts an optical image outputted from the converting portion to an electrical signal.

\* \* \* \* \*